US012737789B2

(12) United States Patent
Senthil et al.

(10) Patent No.: US 12,737,789 B2
(45) Date of Patent: Sep. 15, 2026

(54) SYSTEM AND A METHOD FOR CONVERTING TEXT CONTENT INTO A SHOPPABLE FORMAT

(71) Applicant: firmly Inc, Sammamish, WA (US)

(72) Inventors: Kumar N Senthil, Sammamish, WA (US); Muralidharan Krishnamurthy, Bellevue, WA (US); Romeu Palos de Gouvea, New Castle, WA (US)

(73) Assignee: firmly Inc

( * ) Notice: Subject to any disclaimer, the term of this patent is extended or adjusted under 35 U.S.C. 154(b) by 0 days.

(21) Appl. No.: 18/310,562

(22) Filed: May 2, 2023

(65) Prior Publication Data

US 2024/0370905 A1 Nov. 7, 2024

(51) Int. Cl.

| | |
|---|---|
| ***G06Q 30/0241*** | (2023.01) |
| ***G06Q 20/10*** | (2012.01) |
| ***G06Q 20/40*** | (2012.01) |
| ***G06Q 30/0207*** | (2023.01) |
| ***G06Q 30/0601*** | (2023.01) |

(52) U.S. Cl.
CPC ....... *G06Q 30/0277* (2013.01); *G06Q 20/108* (2013.01); *G06Q 20/40145* (2013.01); *G06Q 30/0239* (2013.01); *G06Q 30/0631* (2013.01); *G06Q 30/0635* (2013.01)

(58) Field of Classification Search
CPC ............. G06Q 30/0277; G06Q 20/108; G06Q 20/40145; G06Q 30/0239; G06Q 30/0631; G06Q 30/0635
See application file for complete search history.

(56) References Cited

U.S. PATENT DOCUMENTS

| | | | |
|---|---|---|---|
| 8,626,491 | B2 | 1/2014 | Gattani et al. |
| 8,880,390 | B2 | 11/2014 | Ceylan et al. |

(Continued)

OTHER PUBLICATIONS

Simone Tedeschi, Simone Conia, Francesco Cecconi, and Roberto Navigli, Named Entity Recognition for Entity Linking: What Works and What's Next, 2021, In Findings of the Association for Computational Linguistics: EMNLP 2021, pp. 2584-2596 (Year: 2021).*

(Continued)

*Primary Examiner* — E Carvalho
(74) *Attorney, Agent, or Firm* — Jason C. Cameron

(57) ABSTRACT

A system for converting a text content into a shoppable content by using a browser plugin is provided. The system includes a processing subsystem which includes a pre-processing module, an artificial intelligence engine, and an overlay generation module. The pre-processing module includes an analysis module configured to understand the text content rendered on a browser page and an identification module configured to identify a plurality of entities from the text content. The artificial intelligence engine is configured to convert the identified plurality of entities to an advertisement content by adding a hyperlink to each of the identified entity, determine a plurality of merchandise mapped to each of the plurality of entities, select a merchandise based on a plurality of merchandise-related factors, and determine a secondary product dynamically if the primary product is unavailable. The overlay generation generates an overlay of the product including a summary of the product.

14 Claims, 8 Drawing Sheets

(56) References Cited

U.S. PATENT DOCUMENTS

| | | | | |
|---|---|---|---|---|
| 10,496,683 | B2 | 12/2019 | Franceschini et al. | |
| 10,547,576 | B1 * | 1/2020 | Kaushal | H04L 69/329 |
| 11,080,737 | B1 * | 8/2021 | Kalra | G06F 16/9566 |
| 2004/0107267 | A1 * | 6/2004 | Donker | G06F 16/9566 709/227 |
| 2006/0014523 | A1 * | 1/2006 | Reilly | G06F 16/9562 455/566 |
| 2006/0112081 | A1 * | 5/2006 | Qureshi | G06F 16/951 |
| 2010/0070529 | A1 * | 3/2010 | Gokturk | G06Q 30/02 715/764 |
| 2010/0138452 | A1 * | 6/2010 | Henkin | G06Q 30/02 707/803 |
| 2013/0103389 | A1 * | 4/2013 | Gattani | G06F 40/295 704/9 |
| 2016/0117730 | A1 * | 4/2016 | Nats | G06Q 30/0257 705/14.55 |
| 2019/0102542 | A1 * | 4/2019 | Hailpern | G06F 21/554 |
| 2022/0300998 | A1 * | 9/2022 | Glazier | H04L 67/535 |
| 2022/0383367 | A1 * | 12/2022 | Chandler | G06Q 30/0641 |
| 2024/0289868 | A1 * | 8/2024 | Locker | G06Q 30/0643 |

OTHER PUBLICATIONS

Public preview: Named Entity Recognition in the Cognitive Services Text Analytics API, Oct. 23, 2018, Microsoft Azure (Year: 2018).*

Starov, O., & Nikiforakis, N. (May 2017). Xhound: Quantifying the fingerprintability of browser extensions. In 2017 IEEE Symposium on Security and Privacy (SP) (pp. 941-956). IEEE. (Year: 2017).*

* cited by examiner

All products featured on Vogue are independently selected by our editors. However, when you buy something through our retail links, we may earn an affiliate commission.

It's rare for Victoria Beckham to leave the house in anything but high heels, however, there was a recent sighting of her wearing a pair of Nike's Air Force 1 sneakers. Sure they've been a throw-on-and-go essential for years, but the way that Beckham wears them makes the classic kicks feel like an elevated closet staple instead of just an afterthought.

During an outing in London, Beckham proved that they're one of the best basics by pairing them with a colorblocked sweater (from her eponymous clothing line, of course), cuffed jeans, and an Hermès Birkin in hand. And earlier in November she styled her new go-to sneakers with a coordinating green hoodie and leggings.

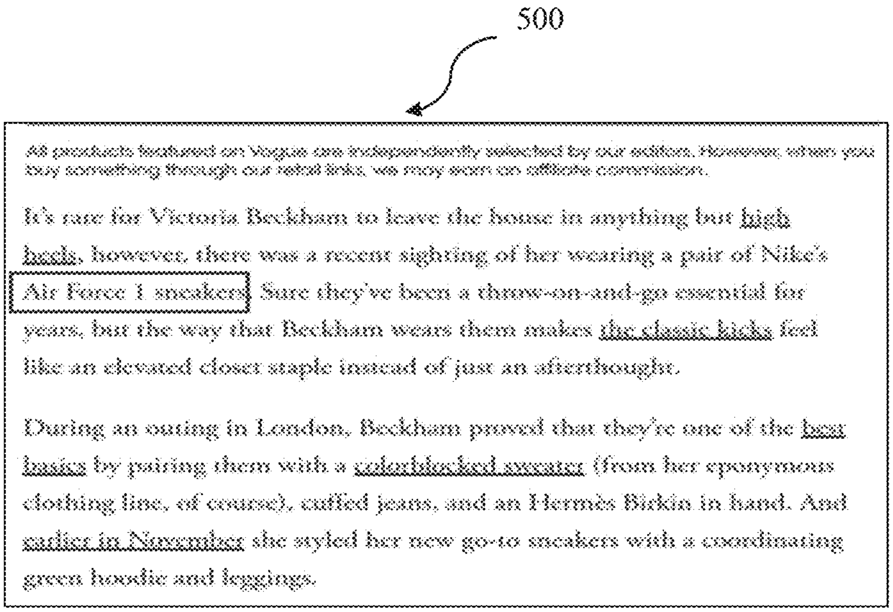

FIG. 5a

All products featured on Vogue are independently selected by our editors. However, when you buy something through our retail links, we may earn an affiliate commission.

It's rare for Victoria Beckham to leave the house in anything but high heels, however, there was a recent sighting of her wearing a pair of Nike's Air Force 1(990.00) Sure they've been a throw-on-and-go essential for years, but the way that Beckham wears them makes the classic kicks feel like an elevated closet staple instead of just an afterthought.

During an outing in London, Beckham proved that they're one of the best basics by pairing them with a colorblocked sweater (from her eponymous clothing line, of course), cuffed jeans, and an Hermès Birkin in hand. And earlier in November she styled her new go-to sneakers with a coordinating green hoodie and leggings.

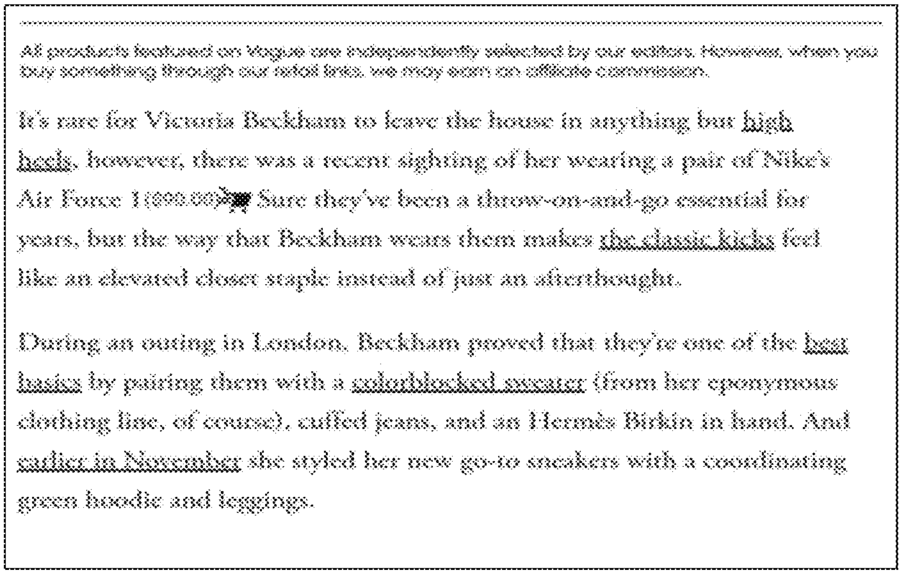

FIG. 5b

Memory

Processing Subsystem

Pre-processing module

Analysis module

Identification module

Updating module

Artificial intelligence engine

Overlay generation module

108

114

116

120

110

112

706

BUS

704

702

Processor (s)

SYSTEM AND A METHOD FOR CONVERTING TEXT CONTENT INTO A SHOPPABLE FORMAT

FIELD OF INVENTION

Embodiments of a present disclosure relate to digital services and more particularly to a system and a method for converting text content into a shoppable format.

BACKGROUND

In recent years there is a massive increase in digital services in all parts of the world. The digital services include content creation, blog writing, and the like. The content creator and blog writer monetise their content by selling the content or providing an advertisement in between the content. Also, the recent decade has witnessed an explosive growth of online shopping Today, a publisher when they write content, adds specific script from the advertising agencies which enables them to render advertisements on their web page. The advertising agencies use the third-party cookies to render the advertisements based on the user's recent browsing history. For example, if the user visits 'XYZ.com', then when the user visits a blogger's website which talks about cooking recipes if they have embedded the script from an advertisement agency, the user would see the advertisement for 'XYZ' products. In such a scenario, the advertisement may or may not be relevant to the content of the page. With the recent changes happening in the mobile ecosystem and due to removal of the third-party cookies from the browsers, these advertisements may lose relevancy.

To solve this, there is a need for a system that may use an artificial intelligence or similar technologies to understand the content on the web page and automatically convert the text content into shoppable content. Also, there is a need for a system that enables users to check out and buy the shoppable content without changing the merchant's website or the payment gateway used by the merchant.

Hence, there is a need for a system for converting text content into a shoppable format that addresses the aforementioned issues.

BRIEF DESCRIPTION

In accordance with one embodiment of the disclosure, a system for converting a text content into a shoppable content by using a browser plugin is disclosed. The system includes a processing subsystem is hosted on a server and configured to execute on a network to control bidirectional communications among a plurality of modules. The processing subsystem includes a pre-processing module, an artificial intelligence engine, and an overlay generation module. The pre-processing module includes an analysis module, an identification module, and updating module. The analysis module is configured to understand the text content rendered on a browser page and a generative content in the absence of a browser plug-in. The identification module is operatively coupled to the analysis module. The identification module is configured to identify a plurality of entities from the text content. The plurality of entities is identified based on the relevancy of the analyzed text content. The updating module is operatively coupled with the analysis module and configured to automatically update the browser page with a modified text content. The artificial intelligence engine is operatively coupled with the extraction module. The artificial intelligence engine is configured to convert the identified plurality of entities from the text content to an advertisement content by adding a hyperlink to each of the identified entity of the plurality of entities. The artificial intelligence engine is also configured to determine a plurality of merchandise mapped to each of the plurality of entities. Further, the artificial intelligence engine is configured to select a merchandise based on a plurality of merchandise-related factors wherein the merchandise-related factors include a primary product availability and cost of the primary product associated with an entity of the plurality of entities. Furthermore, the artificial intelligence engine is configured to determine a secondary product dynamically if the primary product is unavailable. The overlay generation module is operatively coupled with the extraction module and the artificial intelligence engine, wherein the overlay generation module is configured to generate an overlay of the shoppable product comprising a summary of the product.

In accordance with another embodiment, a method for converting a text content to a shoppable format. The method includes analysing, by an analysis module of a pre-processing module of a processing subsystem, the text content rendered on a browser page and a generative content in the absence of a browser plug-in. The method also includes identifying, by an identification module of the pre-processing module of the processing subsystem, a plurality of entities from the text content. The plurality of entities is identified based on the relevancy of the analyzed text content. Further, the method includes updating, by an updating module of the pro-processing module of the processing subsystem, operatively coupled with the analysis module and configured to automatically update the browser page with a modified text content. Furthermore, the method includes converting, by a conversion module of the prep-processing module of the processing subsystem, the identified plurality of entities from the text content to an advertisement content by adding a hyperlink to each of the identified entities of the plurality of entities. Furthermore, the method includes determining, by an artificial intelligence engine of the processing subsystem, a plurality if merchandise mapped to each of the plurality of entities. Furthermore, the method includes selecting, by the artificial intelligence engine of the processing subsystem, product availability and cost of the primary product associated with an entity of the plurality of entities. Furthermore, the method includes determining, by the artificial intelligence engine of the processing subsystem, a secondary product dynamically if the primary product is unavailable. Furthermore, the method includes generating, by an overlay generation module of the processing subsystem, an overlay of the shoppable product comprising a summary of the product. Furthermore, the method includes auto-populating, by a check-out module of the processing subsystem, a product information and enables the user to pay on the browser page.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which:

FIG. 5*a* is a schematic representation of an exemplary screenshot of a browser page with the uploaded text content of FIG. 1 in accordance with an embodiment of the present disclosure;

FIG. 5*b* is a schematic representation of an exemplary screenshot of the browser page with an entity of the plurality of entities with a shoppable product of FIG. 1 in accordance with an embodiment of the present disclosure;

Figure 1:
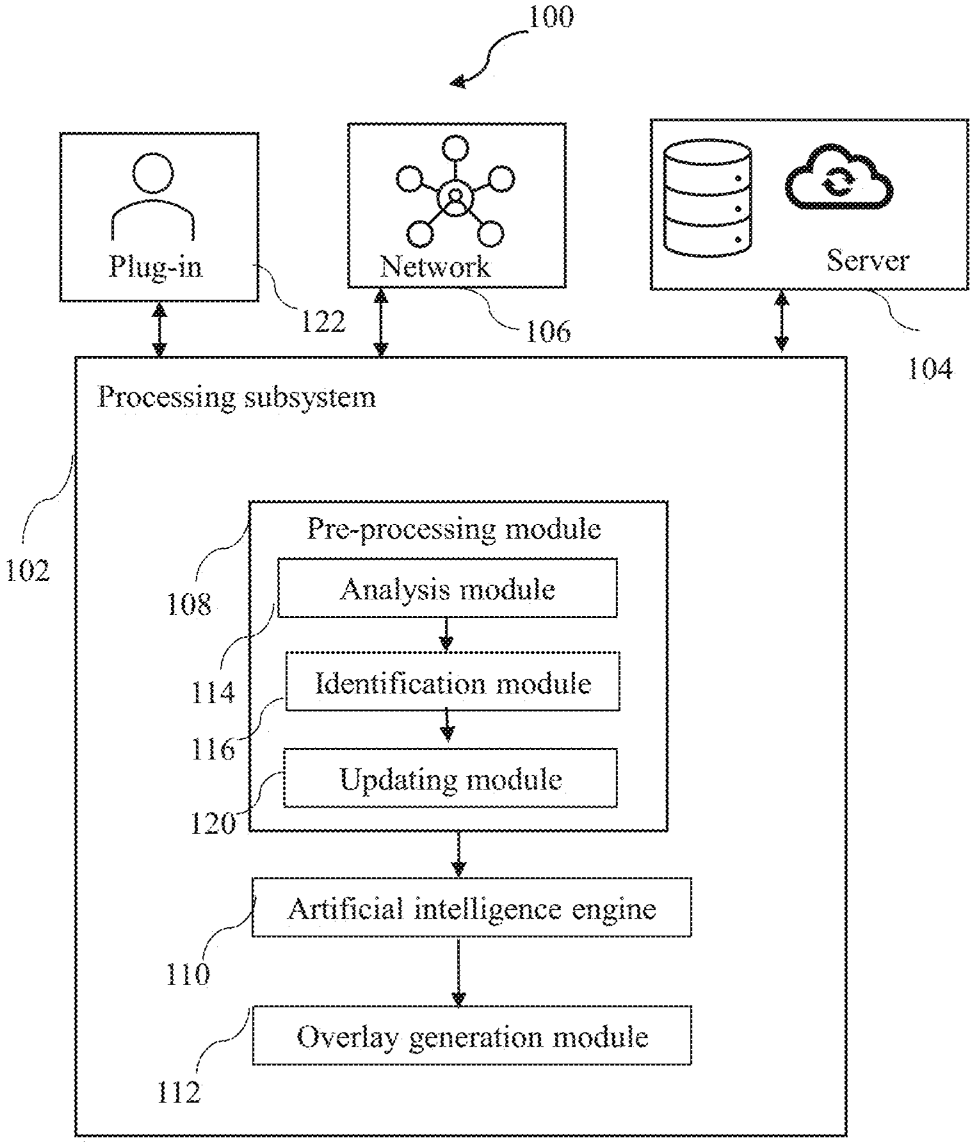
FIG. 1 is a block diagram representing a system for converting text content into a shoppable format in accordance with an embodiment of the present disclosure.

Further, those skilled in the art will appreciate that elements in the figures are illustrated for simplicity and may not have necessarily been drawn to scale. Furthermore, in terms of the construction of the system, one or more components of the system may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for converting a text content into a shoppable content by using a browser plugin. The system includes a processing subsystem is hosted on a server and configured to execute on a network to control bidirectional communications among a plurality of modules. The processing subsystem includes a pre-processing module, an artificial intelligence engine, and an overlay generation module. The pre-processing module includes an analysis configured to understand the text content rendered on a browser page, an identification module is operatively coupled to the analysis module and is configured to identify a plurality of entities from the text content, an updating module operatively coupled with the analysis module and configured to automatically update the browser page with a modified text content. The plurality of entities is identified based on relevancy of the analyzed text content. The artificial intelligence engine operatively coupled with the extraction module. The artificial intelligence engine is configured to convert the identified plurality of entities from the text content to an advertisement content by adding a hyperlink to each of the identified entity of the plurality of entities, determine a plurality of merchandise mapped to each of the plurality of entities, select a merchandise based on a plurality of merchandise-related factors wherein the merchandise-related factors include a primary product availability and cost of the primary product associated with an entity of the plurality of entities, and determine a secondary product dynamically if the primary product is unavailable. The overlay generation module is operatively coupled with the extraction module and the artificial intelligence engine. The overlay generation module is configured to generate an overlay of the shoppable product comprising a summary of the product.

FIG. 1 is a block diagram representing a system 100 for converting a text content into a shoppable content by using a browser plugin in accordance with an embodiment of the present disclosure. The system 100 includes a processing subsystem 102. The processing subsystem 102 is hosted on a server 104 and configured to execute on a network 106 to enable communications among a plurality of modules. In one embodiment, the server 104 may include a cloud server. In another embodiment, the server 104 may include a local server. The processing subsystem 102 is configured to execute on a network 106 to control bidirectional communications among a plurality of modules. In one embodiment, the network may include a wired network such as a local area network (LAN). In another embodiment, the network may include a wireless network such as Wi-Fi, Bluetooth, Zigbee, near field communication (NFC), infra-red communication (RFID) or the like. The plurality of modules includes a pre-processing module 108, an artificial intelligence engine 110, and an overlay generation module 112. Further, the pre-processing module 108 includes an analysis module 114, an identification module 116, and an updating module 120.

The analysis module 114 is configured to understand the text content rendered on a browser page and a generative content in the absence of a browser plug-in.

The identification module 116 is operatively coupled to the analysis module 114 wherein the identification module 116 is configured to identify a plurality of entities from the text content wherein the plurality of entities is identified based on the relevancy of the analyzed text content.

The updating module 120 is operatively coupled with the analysis module 114 and configured to automatically update the browser page with a modified text content. In one embodiment, the updating module 120 is configured to update the merchandise and the merchandise-related factors based on the updated text content.

Figure 2:
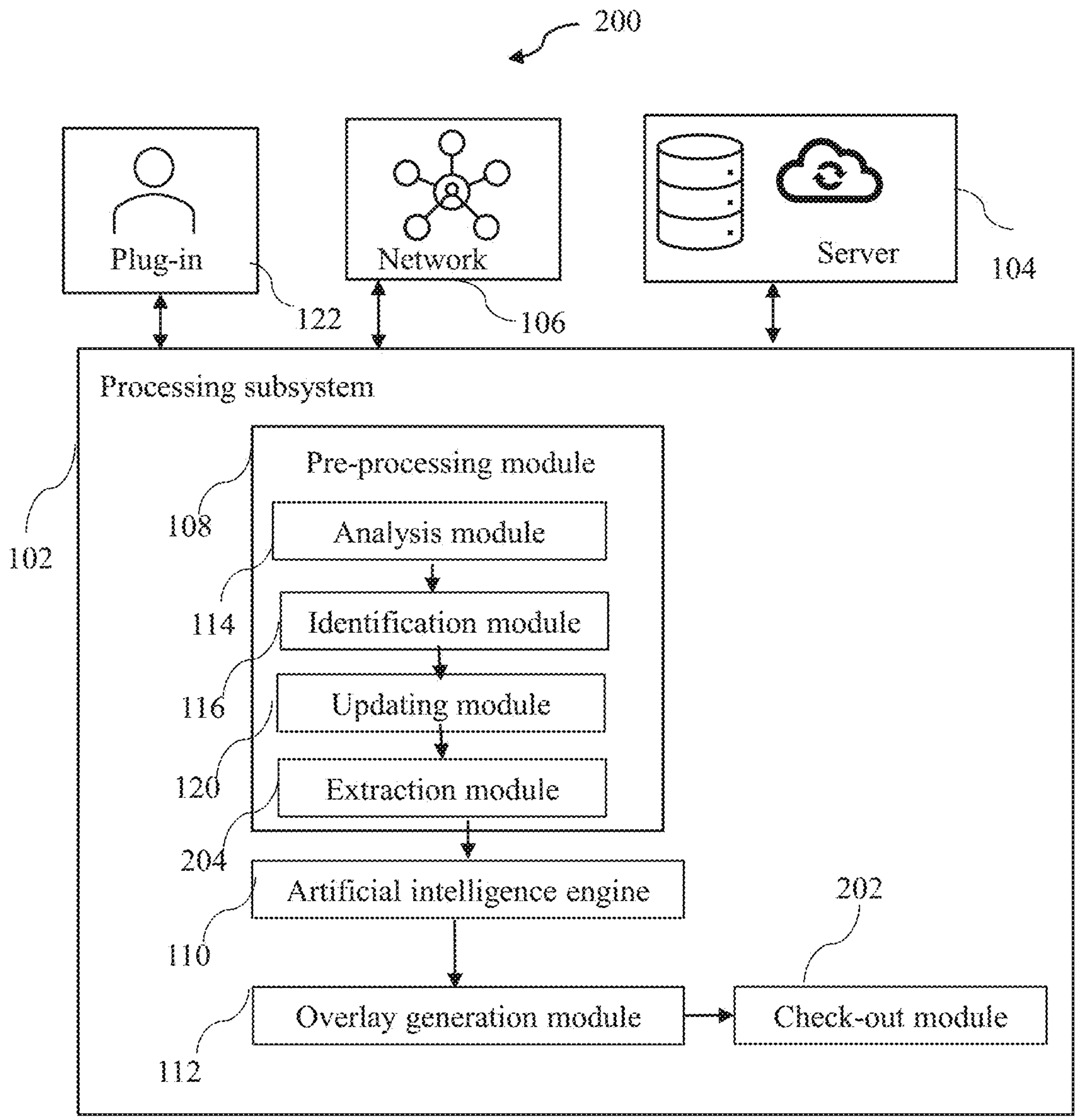
FIG. 2 is a block diagram representing an exemplary embodiment for the system for converting text content into a shoppable form of FIG. 1. in accordance with an embodiment of the present disclosure.

The artificial intelligence engine 110 is operatively coupled with the extraction module (shown in FIG. 2). The artificial intelligence engine 110 is configured to convert the identified plurality of entities from the text content to an advertisement content by adding a hyperlink to each of the identified entities of the plurality of entities. The artificial intelligence engine 110 is also configured to determine a plurality of merchandise mapped to each of the plurality of entities. Further, the artificial intelligence engine 110 is configured to select a merchandise based on a plurality of merchandise-related factors. The merchandise-related factors include a primary product availability and cost of the primary product associated with an entity of the plurality of entities. Furthermore, the artificial intelligence engine 110 is configured to determine a secondary product dynamically if the primary product is unavailable. In one embodiment, the artificial intelligence engine 110 may use machine learning models named entity recognition, or similar technologies to understand the content on the page and automatically convert the text content into shoppable content with checkout enabled.

The overlay generation module 112 is operatively coupled with the pre-processing module 108 and the artificial intelligence engine 110. The overlay generation module 112 is configured to generate an overlay of the shoppable product including a summary of the product.

FIG. 2 is a block diagram representing an exemplary embodiment of pre-processing module 108 FIG. 1 in accordance with an embodiment of the present disclosure. The processing subsystem 102 includes a pre-processing module 108, an artificial intelligence engine 110, and an overlay generation module 112. In one embodiment, the merchandise promotion includes available offers on the price of the product. In one embodiment, the hyperlink includes a browser plug-in 122 (not shown in FIG. 2) for enabling artificial intelligence for converting the shoppable information to the advertisement. In another embodiment, the browser plug-in 122 is configured to run the plurality of modules of the processing subsystem 102. In another embodiment, the hyperlink associated with the shoppable product may be disabled if there is an unavailability of the secondary product. In one embodiment, the summary of the entity of the plurality of entities includes shipping and payment-related information.

In one embodiment, the system 100 includes a check-out module 202 configured to auto-populate a product information and enables the user to pay on the browser page. In one embodiment, the checkout module 202 allows the user to complete the payment for the product without directing the user to a third-party payment gateway or the merchant's website. In another embodiment, the check-out module 202 is configured to allow the user to select a bank for payment of the shoppable product Yet, in another embodiment, the check-out module 202 authenticates the user during check-out. The authentication may be done with a plurality of authentication methods provided by a user authentication information. In one embodiment, the plurality of authentication methods includes a one-time password provided by the user authentication information including user's corresponding bank, credit or debit card issuer, and a biometric authentication to authenticate the user to checkout. In another embodiment, the user authentication information is stored in the user's device enabling a secure payment to the user. Yet, in one embodiment, the check-out module 202 is configured to auto-populate a product information and enables the user to checkout leveraging the merchant's website infrastructure including the payment gateway.

In one embodiment, the pre-processing module 108 includes an extraction module 204 configured to extract the plurality of entities from the text content based on a location of a user, a type of digital device, and a website associated with the text content. In one embodiment, the extraction module 204 extracts all relevant information of the shoppable product.

Figure 3:
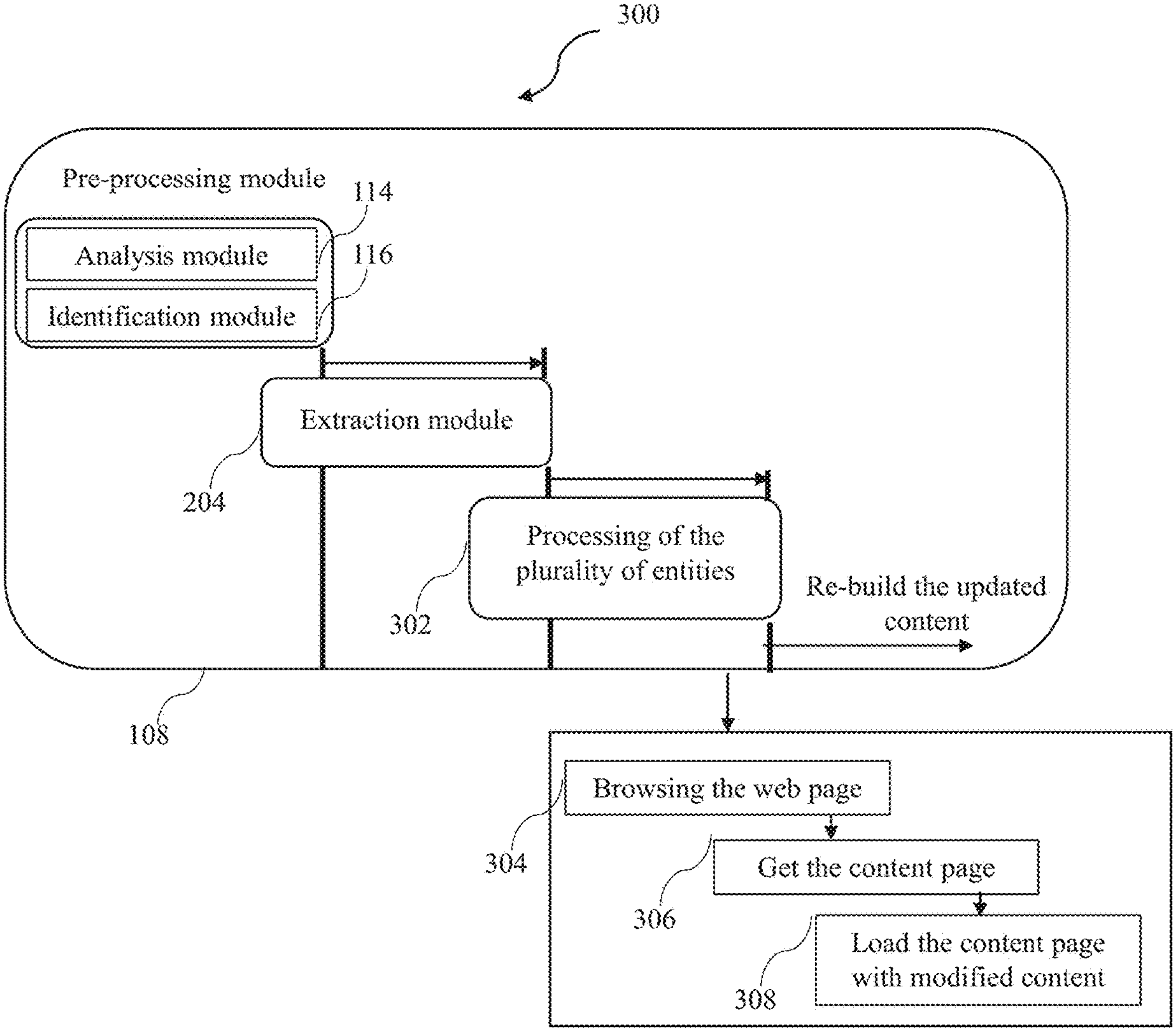
FIG. 3 is a block diagram representing an exemplary embodiment of a pre-processing module of FIG. 1 in accordance with an embodiment of the present disclosure.

FIG. 3 is a block diagram representing an exemplary embodiment of the pre-processing module 108 FIG. 1 in accordance with an embodiment of the present disclosure. In one embodiment, the author authenticates the content that is published on a browser page. The content is automatically analyzed using artificial intelligence and a plurality of relevant entities are extracted by the analysis module 114 and identification module 116. The extraction module 204 extracts the plurality of entities from the content based on a location of a user, a type of digital device, and a website associated with the text content. In one embodiment, the extraction module 204 extracts all relevant information of the shoppable product. If the author updates any content, the browser automatically updates the text content and the relevant entities. Subsequently, the plurality of entities 302 is processed to map corresponding merchandize to the said plurality of entities 302. If the relevant inventory is available then, the latest pricing and promotions for the product is retrieved. Alternatively, if the product is retired, then an alternate/similar/successor product is found. The browser page is then updated with the latest pricing and promotions of the product.

Consider another scenario wherein the user browses the web page 304 and is redirected to get the content page 304. Subsequently, the content page is loaded with the modified content 308 with the latest pricing and promotions for the plurality of entities 302 identified in the content page.

Figure 4:
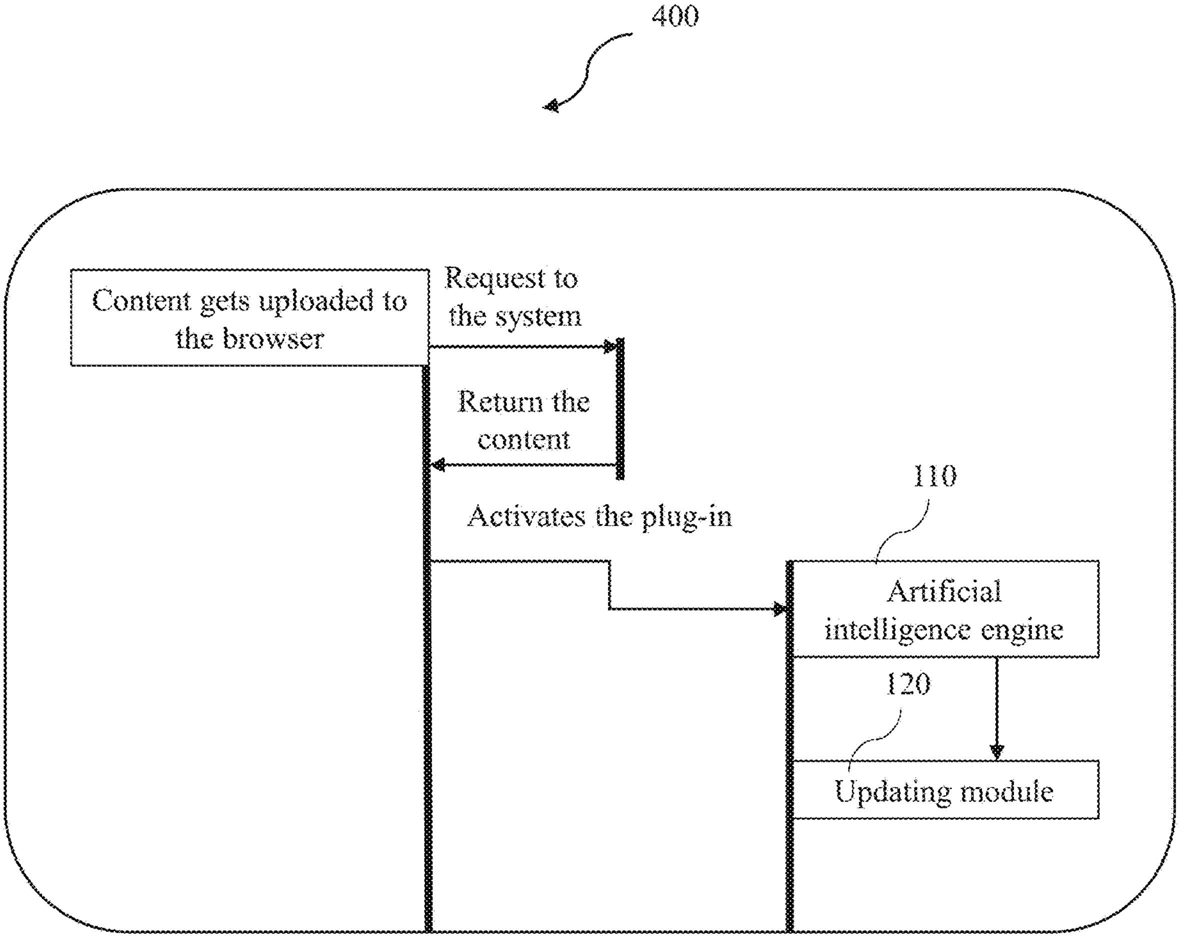
FIG. 4 is a block diagram representing an exemplary embodiment of an updating module of FIG. 1 in accordance with an embodiment of the present disclosure.

FIG. 4 is a block diagram representing another exemplary embodiment of the system 100 for converting the text content into the shoppable format of FIG. 1 in accordance with an embodiment of the present disclosure. The text content is processed dynamically when a user browses a content page via a web browser. When the text content is uploaded on a browser page, the system 100 with browser plug-in 122 is activated and processes the content. In another embodiment, the browser plug-in 122 is installed in a user-side system 100. Upon processing, the plurality of entities 302 are extracted by using artificial intelligence. In one embodiment, the extraction module 204 includes a server component to achieve an optimal speed of processing.

FIG. 5*a* is a schematic representation of an exemplary screenshot of a browser page with the uploaded text content of FIG. 1 in accordance with an embodiment of the present disclosure.

FIG. 5*b* is a schematic representation of an exemplary screenshot of the browser page with an entity of the plurality of entities 302 with a shoppable product of FIG. 1 in accordance with an embodiment of the present disclosure. For example, if the content is about shoes, which has the text "Nike Airforce 1" then make that text a hyperlink or color-coded. In one embodiment, a price also be shown to visually indicate to the customer that they can see and purchase that product in that context itself.

Figure 5C:
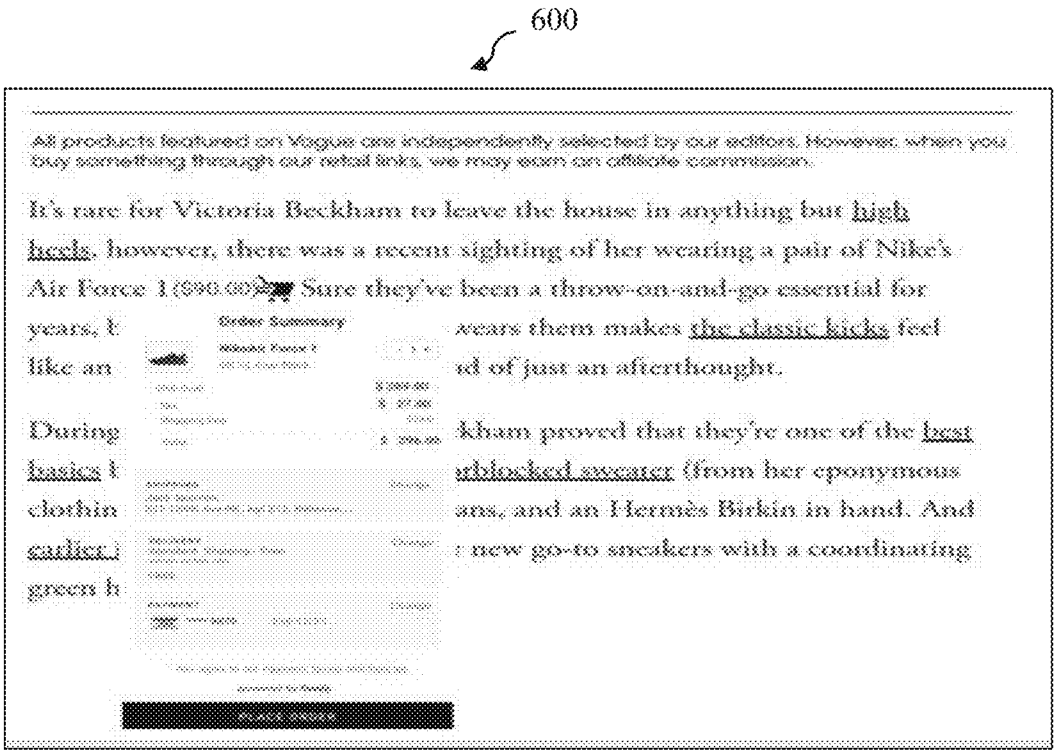
FIG. 5*c* is a schematic representation of an exemplary screenshot of the browser page with an information of the shoppable product of FIG. 1 in accordance with an embodiment of the present disclosure.

FIG. 5*c* is a schematic representation of an exemplary screenshot of the browser page with an information of the shoppable product of FIG. 1 in accordance with an embodiment of the present disclosure. In one embodiment the artificial intelligence or machine learning models such as entity recognition, or similar technologies are used to understand the text content on the web page. In one embodiment a browser or a browser plug or script or similar technology may be used to use an artificial intelligence model to automatically convert the content into shoppable content. A publisher or an author may have to opt into the browser or the browser plug-in 122 or similar technologies. Users also may have an option of opting the browser or the browser plug-in 122. In one embodiment, a revenue share arrangement may be employed in this by the browser or the plugin provider with the publisher. The relevancy of the advertisement for that page may be based on the content, location of the user, type of device, the website, and other relevant information. The system 100 then dynamically determines the seller for that product. For example, even if the content is "Nike Airforce 1", it may be sold by multiple merchants. The system 100 may include an algorithm to determine the specific merchant for that user.

Figure 5D:
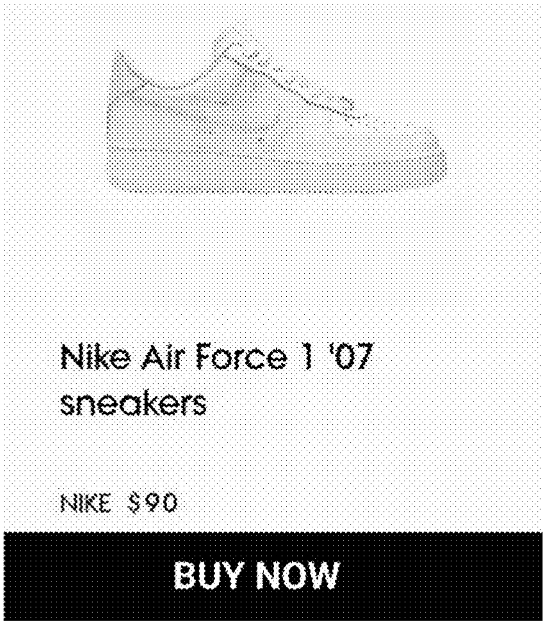
FIG. 5*d* is a schematic representation of an exemplary screenshot of the browser page with a check-out for a shoppable product of FIG. 1 in accordance with an embodiment of the present disclosure.

FIG. 5*d* is a schematic representation of an exemplary screenshot of the browser page with a check-out for a shoppable product of FIG. 1 in accordance with an embodiment of the present disclosure. In one embodiment, when a user selects the shoppable product and opt to buy the product, the system may provide list of merchandise to be selected by the user. When the user selects the merchandise and proceeds for buying the product. In one embodiment, the user may choose to multiple parameters of the product such as colour of the footwear. After selecting the product and parameters the user check-out to pay the price of the product.

Figure 6:
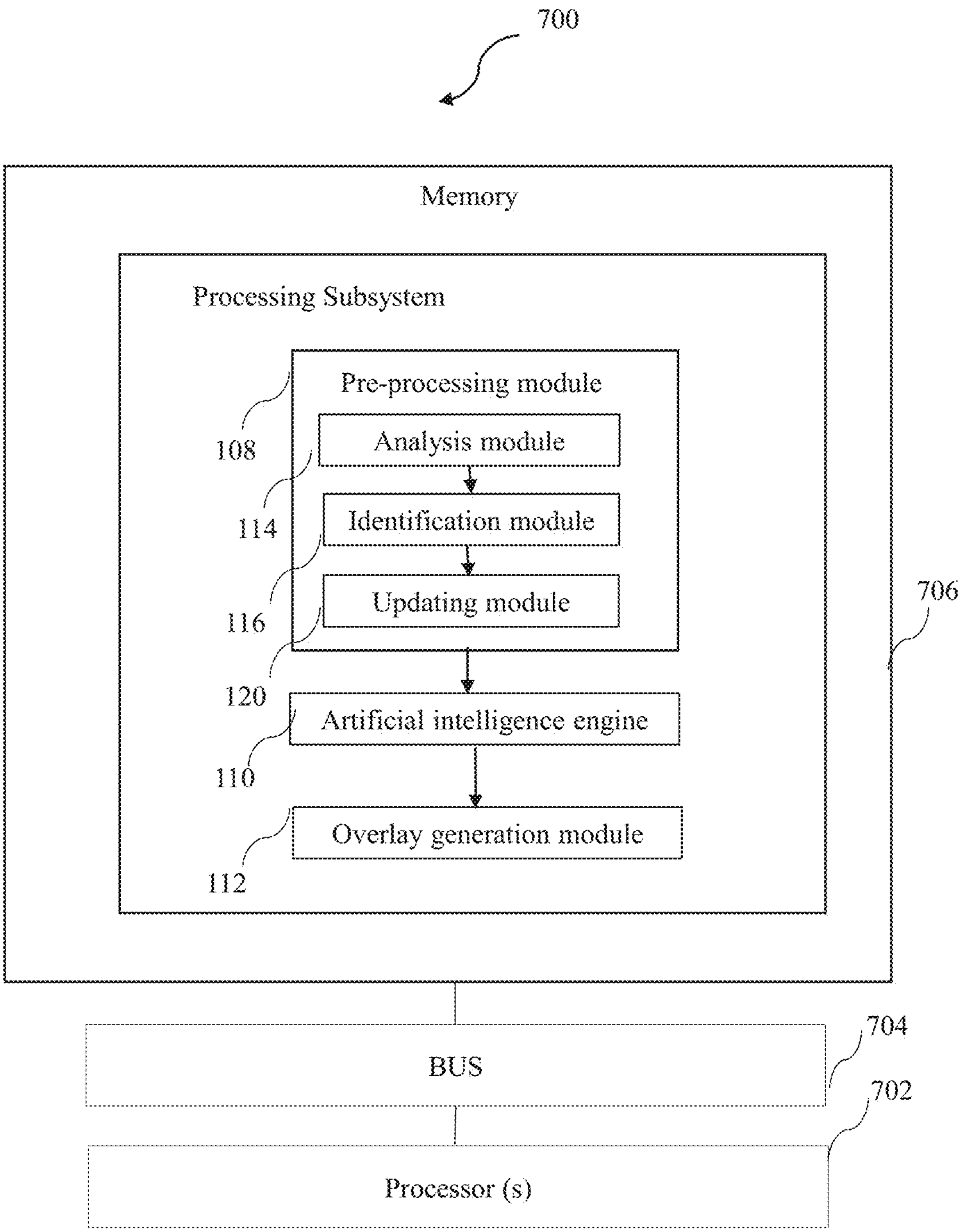
FIG. 6 is a block diagram of a computer or a server for a system for converting text content into a shoppable format in accordance with an embodiment of the present disclosure.

FIG. 6 is a block diagram of a computer or a server 104 for the system converting text content into a shoppable format in accordance with an embodiment of the present disclosure. The server 104 includes processor(s) 702, and memory 706 operatively coupled to the bus 704.

The processor(s) 702, as used herein, means any type of computational circuit, such as, but not limited to, a microprocessor, a microcontroller, a complex instruction set computing microprocessor, a reduced instruction set computing microprocessor, a very long instruction word microprocessor, a explicitly parallel instruction computing microprocessor, a digital signal processor, or any other type of processing circuit, or a combination thereof.

The bus 704 as used herein refers to be internal memory channels or computer network that is used to connect computer components and transfer data between them The bus 704 includes a serial bus or a parallel bus, wherein the serial bus transmits data in bit-serial format and the parallel bus transmits data across multiple wires The bus 704 as used herein, may include but not limited to, a system bus, an internal bus, an external bus, an expansion bus, a frontside bus, a backside bus, and the like.

The memory 706 includes a plurality of subsystems and a plurality of modules stored in the form of executable program which instructs the processor 702 to perform the method steps illustrated in FIG. 1. The memory 706 is substantially similar to the system 100 of FIG. 1. The memory 706 has following submodules: The plurality of modules includes a pre-processing module 108, an artificial intelligence engine 110, and an overlay generation module 112.

The pre-processing module 108 includes an analysis module 114 and an identification module 116. The analysis module 114 is configured to understand the text content rendered on a browser page. The identification module 116 is operatively coupled to the analysis module 114 wherein the identification module 116 is configured to identify a plurality of entities from the text content wherein the plurality of entities is identified based on the relevancy of the analyzed text content.

The artificial intelligence engine 110 is operatively coupled with the extraction module. The artificial intelligence engine 110 is configured to convert the identified plurality of entities from the text content to an advertisement content by adding a hyperlink to each of the identified entities of the plurality of entities. The artificial intelligence engine 110 is also configured to determine a plurality of merchandise mapped to each of the plurality of entities. Further, the artificial intelligence engine 110 is configured to select a merchandise based on a plurality of merchandise-related factors. The merchandise-related factors include a primary product availability and cost of the primary product associated with an entity of the plurality of entities. Furthermore, the artificial intelligence engine 110 is configured to determine a secondary product dynamically if the primary product is unavailable. In one embodiment, the artificial intelligence engine 110 may use machine learning models named entity recognition, or similar technologies to understand the content on the page and automatically convert the text content into shoppable content with checkout enabled.

The overlay generation module 112 is operatively coupled with the pre-processing module 108 and the artificial intelligence engine 110. The overlay generation module 112 is configured to generate an overlay of the shoppable product including a summary of the product.

Computer memory elements may include any suitable memory device(s) for storing data and executable program, such as read-only memory, random access memory, erasable programmable read-only memory, electrically erasable programmable read-only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) (502).

Figure 7:
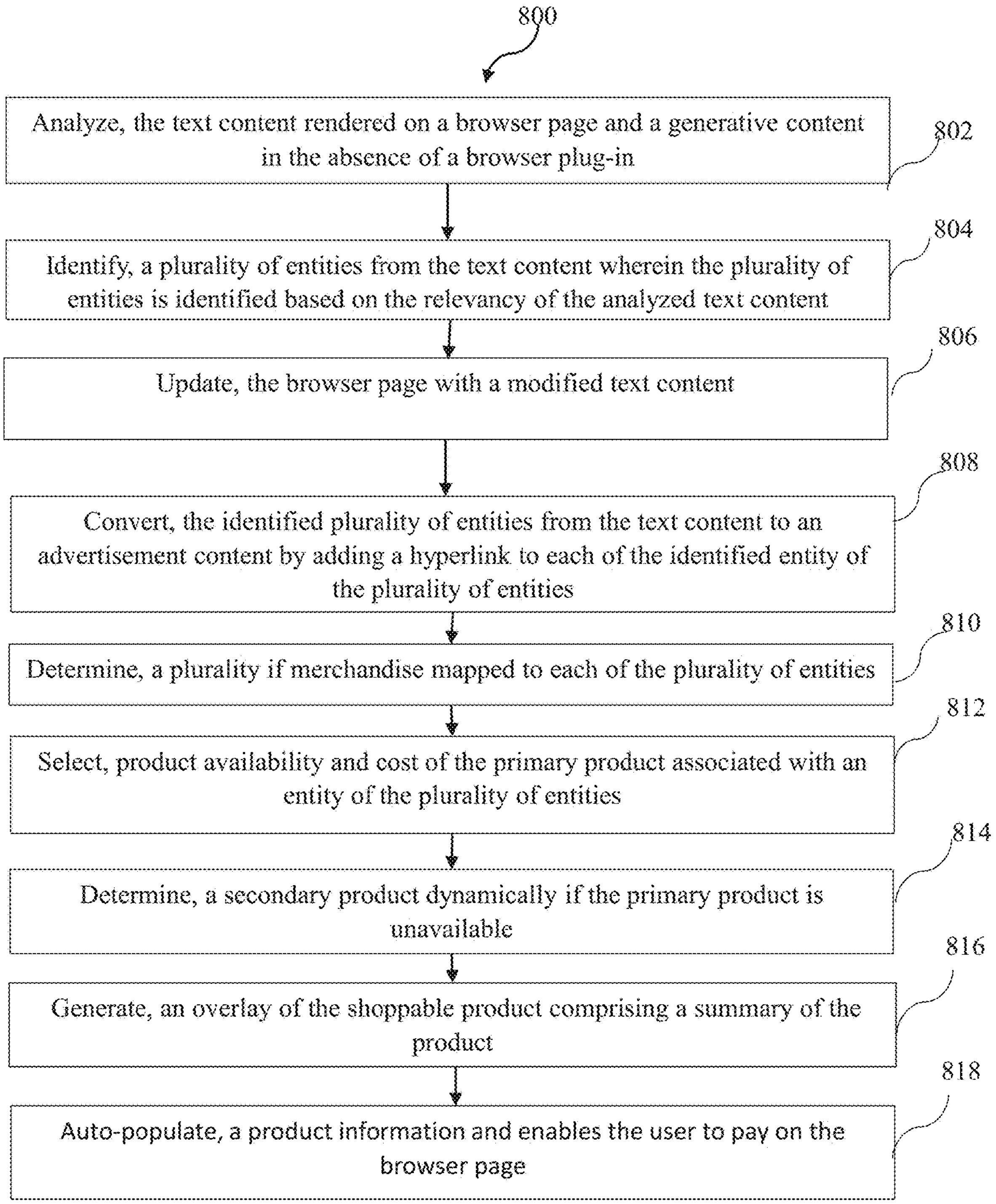
FIG. 7 is a flow chart representing steps involved in a method for converting text content into a shoppable format in accordance with an embodiment of the present disclosure.

FIG. 7 is a flow chart representing steps involved in a method for operating the system 100 for converting text content into shoppable format in accordance with an embodiment of the present disclosure The method 800 includes analysing, by an analysis module of a pre-processing module of a processing subsystem, the text content rendered on a browser page and a generative content in the absence of a browser plug-in in step 802. In one embodiment, the text content is static information.

The method also includes identifying, by an identification module of the pre-processing module of the processing subsystem, a plurality of entities from the text content wherein the plurality of entities is identified based on the relevancy of the analyzed text content in step 804. The method also includes processing, a text content dynamically at the time of browsing the text content by the user.

Further, the method includes converting, by an artificial intelligence engine of the processing subsystem, the identified plurality of entities from the text content to an advertisement content by adding a hyperlink to each of the identified entity of the plurality of entities in step 806. The method also includes enabling, the user to insert a hyperlink during uploading the text content on the browser page. The method also includes enabling, by a browser plug-in, the artificial intelligence for converting the shoppable information to the advertisement.

Furthermore, the method includes updating, by an updating module of the pro-processing module of the processing subsystem, operatively coupled with the analysis module and configured to automatically update the browser page with a modified text content in step 808.

Furthermore, the method includes determining, by the artificial intelligence engine of the processing subsystem, a plurality of merchandise mapped to each of the plurality of entities in step 810.

Furthermore, the method includes selecting, by the artificial intelligence engine of the processing subsystem, product availability and cost of the primary product associated with an entity of the plurality of entities in step 812.

Furthermore, the method includes determining, by the artificial intelligence engine of the processing subsystem, a secondary product dynamically if the primary product is unavailable in step 814.

Furthermore, the method includes generating, by an overlay generation module of the processing subsystem, an overlay of the shoppable product comprising a summary of the product in step 816. The method also includes providing, a merchandise promotion by providing available offers on the price of the product.

Furthermore, the method includes auto-populating, by a check-out module of the processing subsystem, a product information and enables the user to pay on the browser page in step 818. Furthermore, the method includes authenticating, by a checkout module of the processing subsystem, the user during check-out, wherein the authentication is done with a plurality of authentication methods provided by a user authentication information. The method also includes authenticating, by means of a one-time password provided by the user authentication information including user's corresponding bank, credit or debit card issuer, and a biometric authentication to authenticate the user to checkout. The method also includes storing the user authentication information in the user device enabling a secure payment to the user. The method also includes allowing the user to complete the payment for the product without directing the user to the merchant's website. The method also includes allowing the user to select a bank for payment of the shoppable product. The method also includes fetching, a generative content and converting the generative content into shoppable content dynamically without any browser plug-in.

Furthermore, the method includes extracting, by an extraction module of the pre-processing module, the plurality of entities from the text content based on a location of a user, a type of digital device, and a website associated with the text content. The method also includes extracting, the relevant shoppable information from the identified text content by an artificial intelligence engine. The method also includes activating, a plug-in to automatically extract the shoppable information of the product.

Various embodiments of the present disclosure provide conversion of text content into shoppable format. The system disclosed in the present disclosure understands the content on the web page automatically by using an artificial intelligence engine. The artificial intelligence engine converts text content into shoppable content. The system disclosed in the present disclosure facilitates the user to check out and buy the shoppable content on the web page where the text content is published. The check-out module in the present disclosure facilitates the user to buy the product without redirecting to the merchant's website.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for converting a text content into a shoppable content by using a browser plugin comprises:

a processor; and a memory coupled to the processor, wherein the memory comprises a set of program instructions in the form of a processing subsystem, configured to be executed by the processor, wherein the processing subsystem, hosted on a server, and configured to execute on a network to control bidirectional communications among a plurality of modules comprising:

a pre-processing module comprising:

an analysis module configured to understand the text content rendered on a browser page and a generative content in the absence of a browser plug-in;

an identification module operatively coupled to the analysis module wherein the identification module is configured to identify a plurality of entities from the text content based on relevancy of the analyzed text content; and an updating module operatively coupled with the pre-processing module and configured to automatically update the browser page with modified text content, and update merchandise and merchandise-related factors in real time based on the modified text content;

an artificial intelligence engine operatively coupled with an extraction module, wherein the artificial intelligence engine is configured to:

convert the identified plurality of entities from the text content to an advertisement content by adding a hyperlink to each of the identified entity of the plurality of entities, wherein the hyperlink comprises a browser plugin for enabling artificial intelligence for converting shoppable information to the advertisement, wherein the browser plug-in is configured to run the plurality of modules of the processing subsystem;

determine a plurality of merchandise mapped to each of the plurality of entities;

select a merchandise based on a plurality of merchandise related factors wherein the merchandise-related factors comprise at least one of a primary product availability, available offers, location of the user and cost of the primary product associated with an entity of the plurality of entities; and determine a secondary product dynamically if the primary product is unavailable; and machine learning models comprising at least one of entity recognition to understand the content on the browser page and automatically convert the text content into shoppable content with checkout enabled; and an overlay generation module operatively coupled with the preprocessing module and the artificial intelligence engine, wherein the overlay generation module is configured to generate an overlay of a shoppable product comprising a summary of the shoppable product; and a check-out module operatively coupled with the overlay generation module, wherein the check-out module is configured to:

enables a user to choose multiple parameters of the product;

auto-populate a product information and enables a user to pay on the browser page; and enable the user to complete the purchase within content page on the browser without getting redirected to a merchant's website, wherein the hyperlink associated with the shoppable product is disabled due to unavailability of the secondary product.

2. The system according to claim 1, wherein the plurality of merchandise related factors comprises available offers on the price of the shoppable product.

3. The system according to claim 1, wherein the updating module is configured to update the merchandise and the merchandise-related factors based on the updated text content.

4. The system according to claim 1, wherein the check-out module authenticates the user during check-out, wherein the authentication is done with a plurality of authentication methods provided by a user authentication information.

5. The system according to claim 4, wherein the plurality of authentication methods comprises a one-time password or biometric authentication provided by the user to pull the information from user's corresponding bank, credit or debit card issuer or other sources along with the address information to complete the checkout.

6. The system according to claim 5, wherein the user authentication information is stored in a user device enabling a secure payment to the user.

7. The system according to claim 1, wherein the checkout module allows the user to complete the payment for the shoppable product without redirecting the user to the merchant's website.

8. The system according to claim 1, wherein the check-out module is configured to allow the user to select a bank for payment of the shoppable product.

9. The system according to claim 1, comprises an extraction module configured to extract the plurality of entities from the based on a location of a user, a type of digital device, and a website associated with the text content, wherein the extraction module comprises a server component to achieve an optimal speed of processing.

10. A method for converting a text content to a shoppable format comprises:

analysing, by an analysis module of a pre-processing module of a processing subsystem, the text content rendered on a browser page and a generative content in the absence of a browser plug-in;

identifying, by an identification module of the pre-processing module of the processing subsystem, a plurality of entities from the text content wherein the plurality of entities is identified based on the relevancy of the analyzed text content;

updating, by an updating module of the pro-processing module of the processing subsystem, operatively coupled with the analysis module and configured to automatically update the browser page with a modified text content;

converting, by an artificial intelligence engine of the processing subsystem, the identified plurality of entities from the text content to an advertisement content by adding a hyperlink to each of the identified entity of the plurality of entities, wherein the hyperlink comprises a browser plugin for enabling artificial intelligence for converting shoppable information to the advertisement, wherein the browser plug-in is configured to run a plurality of modules of the processing subsystem;

determining, by the artificial intelligence engine of the processing subsystem, a plurality of merchandise mapped to each of the plurality of entities;

selecting, by the artificial intelligence engine of the processing subsystem, product availability and cost of the primary product associated with an entity of the plurality of entities;

determining, by the artificial intelligence engine of the processing subsystem, a secondary product dynamically if the primary product is unavailable;

converting, by the artificial intelligence engine, the text content into shoppable content with checkout enabled by machine learning models comprising at least one of entity recognition to understand the content on the browser page and automatically convert, wherein the text content is at least one of static information and a generative content in the absence of a browser plug-in;

generating, by an overlay generation module of the processing subsystem, an overlay of a shoppable product comprising a summary of the shoppable product; and enabling, by the checkout module of the processing subsystem, the user to choose multiple parameters of the product;

auto-populating, by a check-out module of the processing subsystem, a product information and enables the user to pay on the browser page, wherein enabling the user to complete the purchase within content page on the browser without getting redirected to a merchant's website.

11. The method according to claim 10, comprises processing, a text content dynamically at the time of browsing the text content by the user.

12. The method according to claim 10, comprises activating, a plug-in to automatically extract the shoppable information of the shoppable product.

13. The method according to claim 10, comprises extracting, the shoppable information from the identified text content by an artificial intelligence engine.

14. The method according to claim 10, comprises enabling, the user to insert a hyperlink during uploading the text content on the browser page.

* * * * *